(12) United States Patent
Shu et al.

(10) Patent No.: US 10,680,949 B2
(45) Date of Patent: *Jun. 9, 2020

(54) SYSTEMS AND METHODS FOR IMPLEMENTING A TIME-STAMPED CONTROLLER AREA NETWORK (CAN) BUS MESSAGE

(71) Applicant: Marvell World Trade Ltd., St. Michael (BB)

(72) Inventors: Biing Long Shu, Singapore (SG); Dehuan Meng, Beijing (CN); Hugh Walsh, Los Galtos, CA (US); Fei Wu, Beijing (CN)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/277,253

(22) Filed: Feb. 15, 2019

(65) Prior Publication Data

US 2019/0199632 A1 Jun. 27, 2019

Related U.S. Application Data

(63) Continuation of application No. 15/363,964, filed on Nov. 29, 2016, now Pat. No. 10,212,081.

(Continued)

(51) Int. Cl.
*H04L 12/741* (2013.01)
*H04L 12/40* (2006.01)
(Continued)

(52) U.S. Cl.
CPC .......... *H04L 45/745* (2013.01); *B60R 16/023* (2013.01); *H04L 12/40* (2013.01);
(Continued)

(58) Field of Classification Search
CPC ............ H04L 45/745; H04L 12/40143; H04L 12/40163; H04L 12/4625; H04L 12/4633;
(Continued)

(56) References Cited

U.S. PATENT DOCUMENTS

| 5,524,213 A | 6/1996 | Dais et al. |
| 6,563,832 B1 | 5/2003 | Stuart et al. |

(Continued)

FOREIGN PATENT DOCUMENTS

| EP | 1 916 813 A2 | 4/2008 |
| EP | 2 712 123 | 3/2014 |

(Continued)

OTHER PUBLICATIONS

Kwon et al., "Apparatus and method for forwarding CAN frame", Jan. 9, 2015, KR, KR20150003543A, English machine language translation. (Year: 2015).*

(Continued)

*Primary Examiner* — Paul H Masur
*Assistant Examiner* — Michael K Phillips

(57) ABSTRACT

Systems, methods, and apparatuses are provided herein for time-stamping a Controller Area Network ("CAN") bus message. Control circuitry (e.g., of a network bridge) may receive a CAN message, and may, in response to receiving the CAN message, generate a time stamp. The control circuitry may add an entry to a lookup table stored in memory, wherein the entry correlates a CAN message Identifier ("ID") corresponding to the CAN message with the time stamp. The control circuitry may encapsulate the CAN message and the time stamp, and may transmit the CAN message according to the time stamp.

18 Claims, 2 Drawing Sheets

Related U.S. Application Data

(60) Provisional application No. 62/261,583, filed on Dec. 1, 2015, provisional application No. 62/261,629, filed on Dec. 1, 2015, provisional application No. 62/261,611, filed on Dec. 1, 2015.

(51) Int. Cl.

| | | |
|---|---|---|
| *H04L 12/46* | (2006.01) | |
| *H04L 12/66* | (2006.01) | |
| *H04L 12/761* | (2013.01) | |
| *H04L 12/26* | (2006.01) | |
| *H04L 12/755* | (2013.01) | |
| *H04L 12/841* | (2013.01) | |
| *B60R 16/023* | (2006.01) | |

(52) U.S. Cl.
CPC .. *H04L 12/40143* (2013.01); *H04L 12/40163* (2013.01); *H04L 12/4625* (2013.01); *H04L 12/4633* (2013.01); *H04L 12/4662* (2013.01); *H04L 12/66* (2013.01); *H04L 43/106* (2013.01); *H04L 45/021* (2013.01); *H04L 45/16* (2013.01); *H04L 45/54* (2013.01); *H04L 47/28* (2013.01); *H04L 2012/40215* (2013.01)

(58) Field of Classification Search
CPC ..... H04L 12/66; H04L 12/4662; H04L 12/40; H04L 45/16; H04L 43/106; H04L 45/021; H04L 47/28; H04L 45/54; H04L 2012/40215; H04L 2012/40273; H04L 67/12; H04L 12/40013; H04L 69/28; H04L 2012/40234; H04L 2012/40241; H04L 45/74; H04L 69/22; H04L 47/56; B60R 16/023; H04J 3/0667; H04J 3/0661; H04J 3/0655; H04J 3/0664; H04J 3/067

See application file for complete search history.

(56) References Cited

U.S. PATENT DOCUMENTS

| | | | |
|---|---|---|---|
| 7,307,994 | B2 | 12/2007 | Kurita |
| 8,650,356 | B2 | 2/2014 | Wilson et al. |
| 9,191,467 | B2 | 11/2015 | Triess et al. |
| 2003/0058864 | A1 | 3/2003 | Michels et al. |
| 2006/0109376 | A1 | 5/2006 | Chaffee et al. |
| 2006/0271694 | A1 | 11/2006 | Matsuo et al. |
| 2007/0140294 | A1 | 6/2007 | Takatori |
| 2008/0162860 | A1 | 7/2008 | Sabbatini et al. |
| 2009/0240383 | A1 | 9/2009 | Hung |
| 2010/0329272 | A1 | 12/2010 | Tsuboi et al. |
| 2012/0290166 | A1* | 11/2012 | Wallace ............... G07C 5/085 701/29.2 |
| 2013/0212420 | A1* | 8/2013 | Lawson ............ G05B 19/4185 713/400 |
| 2014/0036693 | A1 | 2/2014 | Mabuchi |
| 2014/0036922 | A1 | 2/2014 | Yousefi |
| 2014/0104056 | A1* | 4/2014 | Ramos .................... B60Q 1/46 340/471 |
| 2014/0146666 | A1 | 5/2014 | Kwan et al. |
| 2014/0211803 | A1 | 7/2014 | Yousefi |
| 2014/0215109 | A1 | 7/2014 | Hopfner |
| 2014/0258571 | A1 | 9/2014 | Hartwich et al. |
| 2014/0281037 | A1* | 9/2014 | Spada .................... H04L 69/28 709/248 |
| 2014/0379954 | A1 | 12/2014 | Hayashi |
| 2015/0003443 | A1 | 1/2015 | Koenigseder |
| 2015/0003456 | A1 | 1/2015 | Seo |
| 2015/0019897 | A1 | 1/2015 | Horihata |
| 2015/0117471 | A1* | 4/2015 | Mizrahi ............. H04L 63/0485 370/512 |
| 2015/0331422 | A1* | 11/2015 | Hartung ................ G05D 1/021 701/23 |
| 2015/0370535 | A1 | 12/2015 | Ralston |
| 2016/0197944 | A1 | 7/2016 | Allouche et al. |
| 2017/0072876 | A1 | 3/2017 | Rajan et al. |
| 2017/0104631 | A1* | 4/2017 | Chae .................. H04L 49/9036 |
| 2017/0118038 | A1 | 4/2017 | Ujiie et al. |
| 2017/0131610 | A1 | 5/2017 | Brown et al. |

FOREIGN PATENT DOCUMENTS

| | | | |
|---|---|---|---|
| EP | 2 863 588 A2 | | 4/2015 |
| JP | 2010177764 A | * | 8/2012 |
| KR | 20150003543 A | * | 1/2015 |
| WO | WO 01/45348 | | 6/2001 |

OTHER PUBLICATIONS

Ricardo et al., "Gateway device and diagnosis method thereof", Aug. 12, 2010, JP, JP2010177764A, English machine language translation. (Year: 2010).*

Barranco, et al., Boosting the Robustness of Controller Area Networks CANcentrate and ReCANcantrate, Computer, IEEE, Computer Society, vol. 42, No. 5, pp. 66-73, May 1, 2009.

Barranco, et al., ReCANcentrate a Replicated Star Topology for CAN Networks, 10th IEEE International Conference on Emerging Technnologies and Factory Automation, IEEE, vol. 2, pp. 469-476, Sep. 19, 2005.

Contempory Controls, "Extendabus Tutorial", Feb. 1, 2001, Contemporary Control (24 pages).

Herber, et al., Real-Time Capable CAN to AVB Ethernet Gateway Using Frame Aggregation and Scheduling, pp. 61-66, Mar. 9, 2015.

IEEE Std 802.1AS™—2011, "IEEE Standard for Local and Metropolitan Area Networks—Timing and Synchronization for Time-Sensitive Applications in Bridged Local Area Networks," IEEE Computer Society, Mar. 30, 2011. 292 pages.

Kern, et al., Gateway Strategies for Embedding of Automative CAN-Frames into Ethernet-Packets and Vice Versa, Network and Parallel Computing, Lecture Notes in Computer Science, pp. 259-270, Feb. 24, 2011.

\* cited by examiner

SYSTEMS AND METHODS FOR IMPLEMENTING A TIME-STAMPED CONTROLLER AREA NETWORK (CAN) BUS MESSAGE

CROSS-REFERENCE TO RELATED APPLICATIONS

This patent application is a continuation of U.S. patent application Ser. No. 15/363,964, filed Nov. 29, 2016 (now allowed), which claims the benefit of U.S. Provisional Patent Application No. 62/261,583, filed Dec. 1, 2015, and also claims the benefit of U.S. Provisional Patent Application No. 62/261,611, filed Dec. 1, 2015, and also claims the benefit of U.S. Provisional Patent Application No. 62/261,629, filed Dec. 1, 2015, the disclosures of which are each hereby incorporated by reference herein in their entireties.

BACKGROUND

A Controller Area Network ("CAN") is a serial communication protocol developed by Bosch. Messaging in a CAN is performed over a CAN bus. A CAN bus is a message-based bus that allows devices to communicate with one another without any central arbitration. Each message is broadcast to all nodes on the bus, and each message has an assigned priority. Priorities of the messages are embedded in frames of those messages, and an arbitration protocol guarantees that messages with higher priorities will be transmitted before messages with lower priorities. A CAN bus is conventionally a local bus that only transmits messages between devices directly connected by the CAN bus.

SUMMARY

Systems, methods, and apparatuses are disclosed herein for time-stamping a Controller Area Network ("CAN") bus message. In some aspects, control circuitry (e.g., of a network bridge, such as an Ethernet bridge) may receive a CAN message, and, in response to receiving the CAN message, may generate a time stamp. When generating the time stamp, the control circuitry may add an amount of latency to a time at which the CAN message is received.

The control circuitry may add an entry to a lookup table stored in memory of the network bridge, where the entry correlates a CAN message ID (identifier) corresponding to the CAN message with the time stamp. The control circuitry may add the entry to the lookup table in response to receiving a last bit of an End-of-Frame corresponding to the CAN message.

The lookup table may include a finite amount of entries, where each entry of the finite amount of entries has an associated age. Thus, if the finite number of entries has been reached, when a new entry is added, the control circuitry may delete an oldest entry in the lookup table, increase the age of each entry remaining in the lookup table, and assign the added entry an age that is youngest relative to each other entry of the lookup table.

The control circuitry may encapsulate the CAN message with the time stamp, and may transmit the CAN message according to the time stamp. The transmission may be, for example, over a switched network such as an Ethernet network.

In some embodiments, the time stamp may indicate a time in which a Start-of-Frame ("SOF") of the CAN message is received by the network bridge. Thus, the control circuitry may determine the CAN message ID by, in response to the network bridge receiving the SOF of the CAN message, monitoring a CAN bus of the CAN network for a CAN frame corresponding to the CAN message, detecting, from the monitoring, the CAN frame, and identifying the CAN message ID from an arbitration field of the CAN frame.

The control circuitry, when transmitting the CAN message according to the time stamp of the entry, may determine that a message with the CAN message ID is to be transmitted over an Ethernet network. The control circuitry may determine a time stamp associated with the CAN message ID by looking up the CAN message ID in the lookup table, and may schedule the CAN message for transmission over the Ethernet network based on the time stamp.

The control circuitry, when determining the time stamp associated with the CAN message ID, may detect, when looking up the CAN message ID in the lookup table, a plurality of entries that each correspond to the CAN message ID. The control circuitry may determine a time stamp for each entry of the plurality of entries, and may select the time stamp of the entry with a smallest corresponding age.

DETAILED DESCRIPTION

Systems and methods are provided herein for enabling CAN messages to be transmitted from a node on one CAN bus to a node on a different CAN bus. To this end, a switched network bridge, such as an Ethernet bridge, is used to connect nodes that are on different CAN buses. While Ethernet is a time-sensitive protocol that relies on time stamps to transmit messages, the CAN protocol is not time-sensitive, and relies on an arbitrator and the above-mentioned priority scheme to ensure messages are delivered in a proper order. Thus, in order to transmit CAN messages by way of a time-sensitive protocol such as Ethernet, systems, methods, and apparatuses are described herein for applying a time stamping mechanism to CAN messages.

Figure 1:
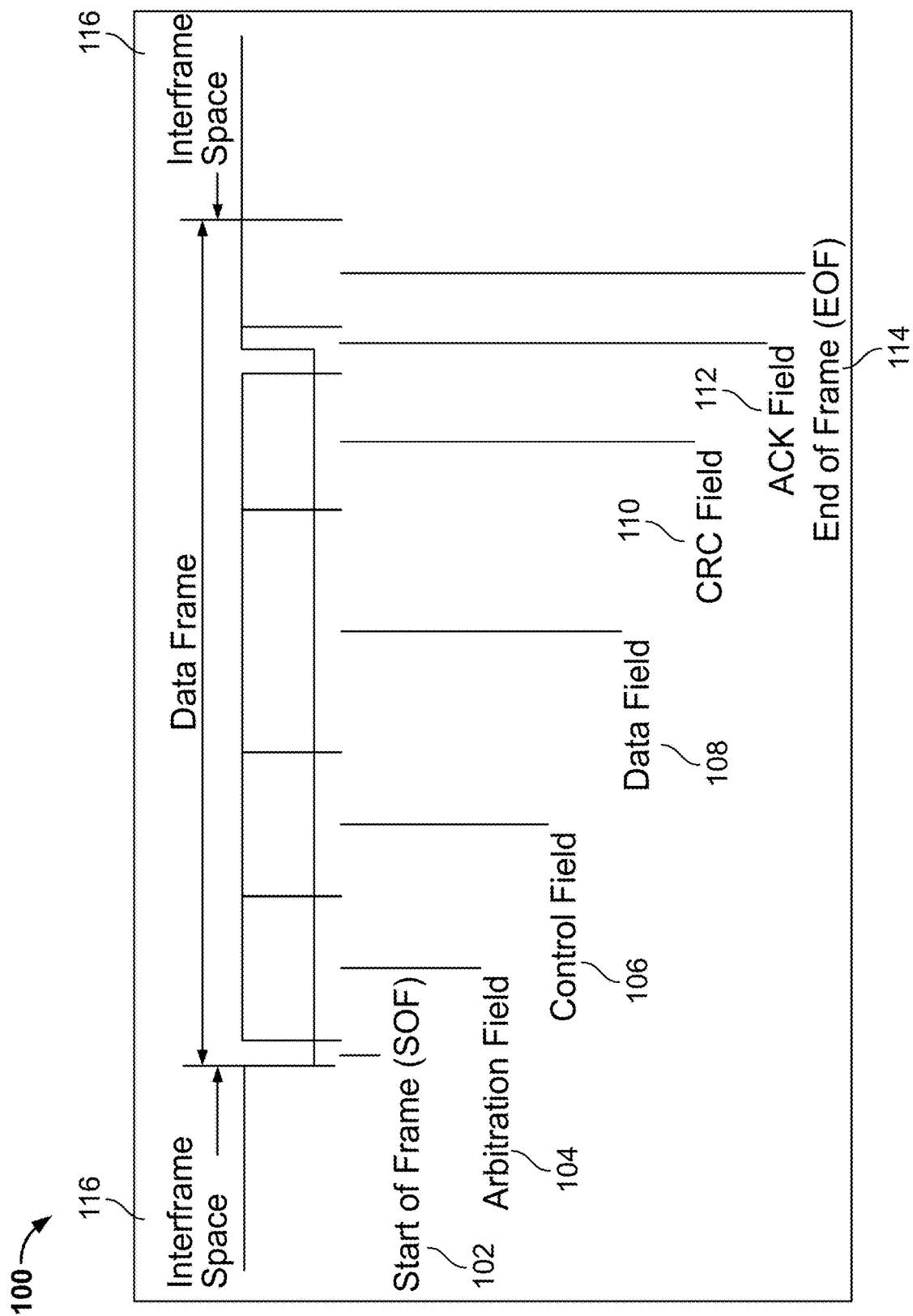
FIG. 1 is an illustrative depiction of the contents of a CAN data frame, in accordance with some embodiments of the disclosure.

FIG. 1 is an illustrative depiction of the contents of a CAN data frame, in accordance with some embodiments of the disclosure. FIG. 1 depicts CAN data frame 100 (also referred to herein generally as "data frame 100") of a CAN message, which includes Start of Frame ("SoF") 102, arbitration field 104, control field 106, data field 108, Cyclic Redundancy Check ("CRC") field 110, ACKnowledgment ("ACK") field 112, End of Frame ("EoF") 114, and interframe space 116. Control circuitry of a bridge of a switched network, such as an Ethernet bridge, may monitor a CAN bus and detect SOF 102.

SoF 102 indicates a beginning of a frame. All components following SoF 102 are thus understood by the control circuitry as being part of frame 100 until EoF 114 is detected, as EoF 114 indicates an end to the frame. Arbitration field 104 includes a CAN message ID (identifier) of data frame 100, which may, among other things, be used to determine a priority in which the message is to be treated under the CAN protocol. Control field 106 may include control information for data frame 100, and data field 108 may include a payload or other data carried by data frame 108. CRC field 110 may be used to detect errors or corruption associated with data frame 100. ACK field 112 may be used in association with acknowledgment of delivery of data frame 100. Interframe spaces 116 includes the space between data frame 100 and other data frames later or earlier received by the control circuitry.

When the control circuitry receives SoF 102, the control circuitry may generate a timestamp for data frame 100 that corresponds to when SoF 102 was received. As an example, the timestamp may be generated by latching a gPTP time (as described in the Institute of Electrical and Electronics Engineers ("IEEE") 802.1AS standard) based on SoF 102. This timestamp may be stored in memory to a timestamp lookup table, which is described in further detail below with respect to FIG. 2.

After receiving SoF 102, the control circuitry may continue to monitor the CAN bus from which data frame 100 was received, and may thereby detect arbitration field 104 of data frame 100. The control circuitry may obtain the CAN message ID corresponding to the data frame 100 from arbitration field 104, and may add the CAN message ID to the same entry of the timestamp lookup table to which the timestamp was added. When EoF 114 is detected from the continued monitoring, data frame 100 may be buffered or otherwise stored at the bridge for transmission to a destination CAN bus. The timestamp entry may be created and/or stored by the control circuitry at the time that EoF 114 is detected, in addition to, or alternative to, doing so when SoF 102 is detected. The timestamp may be a time of detection, or may be a time of detection plus some additional latency.

Figure 2:
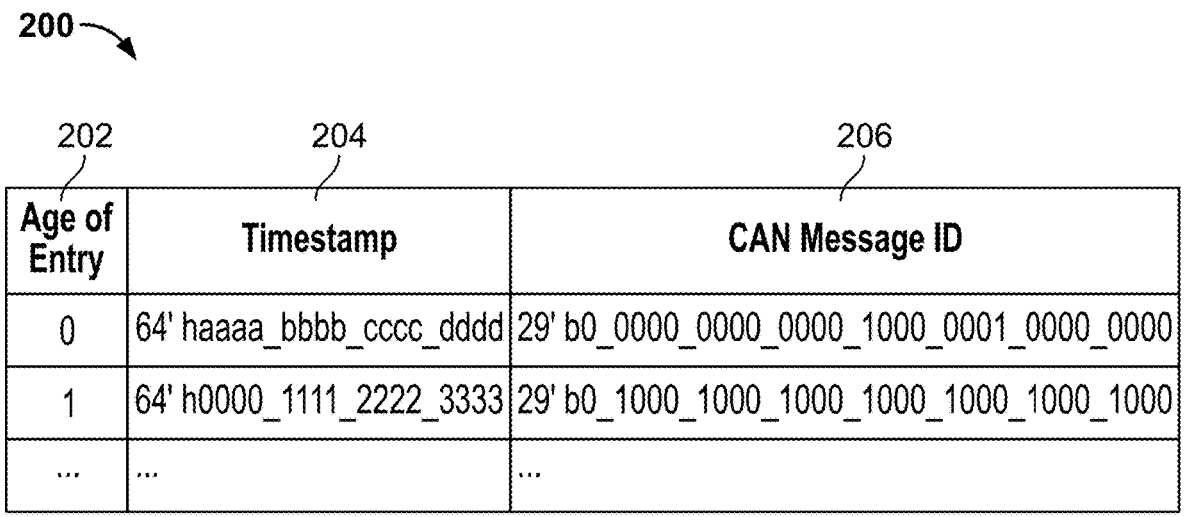
FIG. 2 is an illustrative depiction of a timestamp lookup table on a switched network bridge that bridges two CAN networks, in accordance with some embodiments of the disclosure.

FIG. 2 is an illustrative depiction of a timestamp lookup table on a switched network bridge that bridges two CAN networks, in accordance with some embodiments of the disclosure. Each entry of timestamp lookup table 200 includes age 202 (age of entry), timestamp 204, and CAN message ID 206. The manner in which timestamp 204 and CAN message ID 206 are input into each entry of timestamp lookup table 200 are described above with respect to FIG. 1. Age 202 reflects how old an entry is relative to other entries of timestamp lookup table 200. Thus, whenever a new entry is added to timestamp lookup table 200 (i.e., when a new data frame 100 is detected), that new entry will become the youngest entry in timestamp lookup table 200, and the ages of the other entries of timestamp lookup table 200 will be increased.

When control circuitry of the switched network bridge is ready to transmit a CAN message to another CAN bus by way of a switched network, the control circuitry of the switched network bridge will look up CAN message ID 206 of the CAN message in timestamp lookup table 200, and will use timestamp 204 to time the transmission of the CAN message. In the case where a plurality of entries with a same CAN message ID 206 exist, the control circuitry may select the timestamp of the entry with the smallest age 202. After the CAN message is selected, the control circuitry will package timestamp 204 and CAN message ID 206 into a switched network frame, such as an Ethernet frame, and will transmit the CAN message by way of the switched network to the destination CAN bus.

Figure 3:
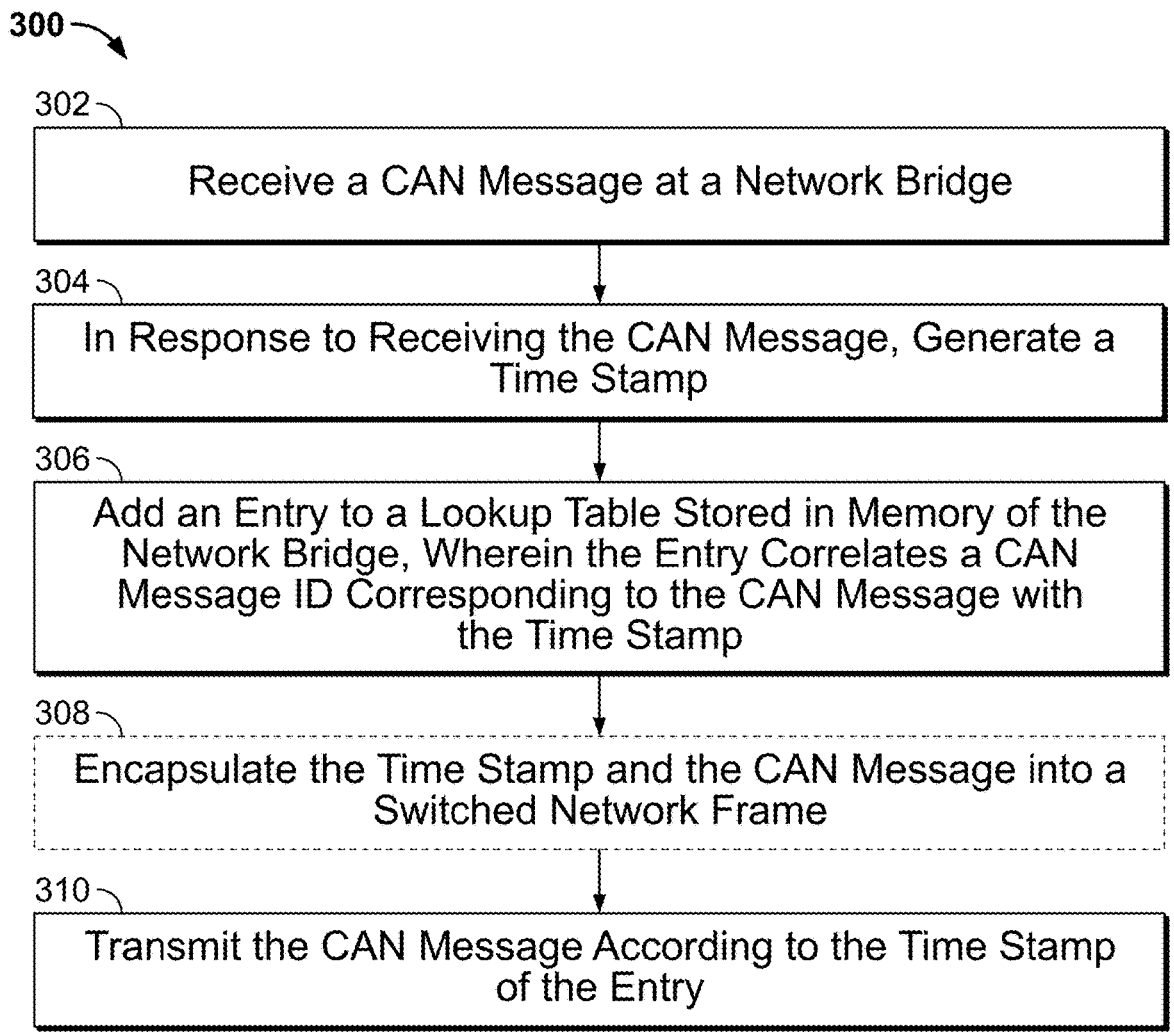
FIG. 3 is an illustrative flow chart that depicts a process for using a timestamp lookup table to enable transmission of CAN messages across a switched network, in accordance with some embodiments of the disclosure.

FIG. 3 is an illustrative flow chart that depicts a process for using a timestamp lookup table to enable transmission of CAN messages across a switched network, in accordance with some embodiments of the disclosure. Process 300 begins at 302, where control circuitry of a switched network bridge, such as an Ethernet bridge, receives a CAN message. Process 300 continues to 304, where, in response to receiving the CAN message, the control circuitry generates a time stamp. This time stamp may be based on the SoF or EoF of data frame 100, as described above.

Process 300 continues to 306, where the control circuitry of the switched network bridge may add an entry to a lookup table (e.g., timestamp lookup table 200) stored in memory of the bridge, where the entry may correlate a CAN message ID corresponding to the CAN message (e.g., CAN message ID 206) with the time stamp (e.g., timestamp 204). As described above, the entry may contain additional information, such as age 202. Process 300 may continue to 308, where the control circuitry may encapsulate the time stamp and the CAN message may into a switched network frame (e.g., Ethernet frame) to be sent over the network. Process 300 continues to 310, where the control circuitry may transmit the CAN message according to the time stamp of the entry (e.g., by transmitting the encapsulated time stamp and CAN message). The control circuitry at the destination of the frame may choose to transmit the frame with reference to the time stamp.

The foregoing describes systems, methods, and apparatuses for switching CAN messages over a switched network bridge by using a timestamp lookup table. The above-described embodiments of the present disclosure are presented for the purposes of illustration and not of limitation. Furthermore, the present disclosure is not limited to a particular implementation. For example, one or more steps of the methods described above may be performed in a different order (or concurrently) and still achieve desirable results. In addition, the disclosure may be implemented in hardware, such as on an application-specific integrated circuit (ASIC) or on a field-programmable gate array (FPGA). The disclosure may also be implemented in software by, for example, encoding transitory or non-transitory instructions for performing the process discussed above in one or more transitory or non-transitory computer-readable media.

What is claimed is:

1. A method for a transmitting a Controller Area Network ("CAN") message, comprising:
   receiving a CAN message at a network bridge that bridges the CAN to an Ethernet network;
   in response to receiving the CAN message at the network bridge, generating a time stamp indicative of a time at which the CAN message was received;
   encapsulating the time stamp and the CAN message into an Ethernet frame; and
   transmitting the Ethernet frame containing the encapsulated time stamp and CAN message over the Ethernet network.

2. The method for transmitting the CAN message of claim 1, further comprising:
   adding an entry to a lookup table stored in a memory of the network bridge, wherein the entry correlates a CAN message Identifier ("ID") corresponding to the CAN message with the time stamp.

3. The method for transmitting the CAN message of claim 2, wherein adding the entry to the lookup table comprises adding the entry to the lookup table in response to receiving a last bit of an End-of-Frame marker ("EOF") of the CAN message.

4. The method for transmitting the CAN message of claim 2, wherein transmitting the Ethernet frame containing the encapsulated time stamp and CAN message over the Ethernet network further comprises:

detecting, upon looking up the CAN message ID in the lookup table, a plurality of entries, ones of the plurality of entries respectively corresponding to the CAN message ID;

determining a respective time stamp for each entry among the plurality of entries; and selecting the respective time stamp of the entry among the plurality of entries having a smallest corresponding age.

5. The method for transmitting the CAN message of claim 2, wherein the lookup table comprises a finite quantity of entries, wherein ones of the entries among the finite quantity of entries comprises an associated age, and wherein adding the entry to the lookup table comprises:

deleting an oldest entry in the lookup table;

incrementally increasing the age of ones of the entries remaining in the lookup table; and assigning the added entry an age that is a youngest age among other entries of the lookup table.

6. The method for transmitting the CAN message of claim 1, wherein the time stamp indicates a time at which a Start-of-Frame marker ("SOF") of the CAN message is received by the network bridge.

7. The method for transmitting the CAN message of claim 6, wherein the method further comprises determining a CAN message ID by, in response to the network bridge receiving the SOF of the CAN message:

detecting, by monitoring the CAN bus, a CAN frame containing the CAN message; and identifying the CAN message ID from an arbitration field of the CAN frame.

8. The method for transmitting the CAN message of claim 1, wherein generating the time stamp comprises adding an amount of delay to a time at which the CAN message is received.

9. The method for transmitting the CAN message of claim 1, wherein transmitting the Ethernet frame containing the encapsulated time stamp and CAN message over the Ethernet network comprises:

scheduling the CAN message for transmission over the Ethernet network based on the time stamp; and transmitting the Ethernet frame over the Ethernet network from the network bridge based on the scheduling.

10. A system for transmitting a Controller Area Network ("CAN") message, comprising:

a network bridge that bridges the CAN to an Ethernet network, comprising:

a memory; and control circuitry configured to:

receive a CAN message;

in response to receiving the CAN message at the network bridge, generate a time stamp indicative of a time at which the CAN message was received;

encapsulate the time stamp and the CAN message into an Ethernet frame; and transmit the Ethernet frame containing the encapsulated time stamp and CAN message over the Ethernet network.

11. The system for transmitting the CAN message of claim 10, wherein the control circuitry is further configured to:

add an entry to a lookup table stored in a memory of the network bridge, wherein the entry correlates a CAN message Identifier ("ID") corresponding to the CAN message with the time stamp.

12. The system for transmitting the CAN message of claim 11, wherein the control circuitry, when adding the entry to the lookup table, is configured to:

add the entry to the lookup table in response to receiving a last bit of an End-of-Frame marker ("EOF") of the CAN message.

13. The system for transmitting the CAN message of claim 11, wherein the control circuitry, when transmitting the Ethernet frame containing the encapsulated time stamp and CAN message over the Ethernet network, is further configured to:

detect, upon looking up the CAN message ID in the lookup table, a plurality of entries, ones of the plurality of entries respectively corresponding to the CAN message ID;

determine a respective time stamp for each entry among the plurality of entries; and select the respective time stamp of the entry among the plurality of entries having a smallest corresponding age.

14. The system for transmitting the CAN message of claim 11, wherein the lookup table comprises a finite quantity of entries, wherein ones of the entries among the finite quantity of entries comprises an associated age, and wherein the control circuitry, when adding the entry to the lookup table, is further configured to:

delete an oldest entry in the lookup table;

incrementally increase the age of ones of the entries remaining in the lookup table; and assign the added entry an age that is a youngest age among other entries of the lookup table.

15. The system for transmitting the CAN message of claim 10, wherein the time stamp indicates a time at which a Start-of-Frame marker ("SOF") of the CAN message is received by the network bridge.

16. The system for transmitting the CAN message of claim 15, wherein the control circuitry is further configured to:

determine a CAN message ID by, in response to the network bridge receiving the SOF of the CAN message:

detect, by monitoring the CAN bus, a CAN frame containing the CAN message; and identify the CAN message ID from an arbitration field of the CAN frame.

17. The system for transmitting the CAN message of claim 10, wherein the control circuitry, when generating the time stamp is further configured to:

add an amount of delay to a time at which the CAN message is received.

18. The system for transmitting the CAN message of claim 10, wherein the control circuitry, when transmitting the Ethernet frame containing the encapsulated time stamp and CAN message over the Ethernet network is further configured to:

schedule the CAN message for transmission over the Ethernet network based on the time stamp; and transmit the Ethernet frame over the Ethernet network from the network bridge based on the scheduling.

* * * * *